United States Patent
Shih et al.

(10) Patent No.: US 9,546,000 B2
(45) Date of Patent: Jan. 17, 2017

(54) FIXING STRUCTURE FOR FIXING A SEAT OF A VEHICLE

(71) Applicant: SUPER ALLOY INDUSTRIAL CO., LTD., Yunlin County (TW)

(72) Inventors: Henry Shih, Yunlin County (TW); Wen-Ping Tsai, Yunlin County (TW); Chin-Chuan Liang, Yunlin County (TW)

(73) Assignee: Super Alloy Industrial Co., Ltd., Douliu (TW)

( * ) Notice: Subject to any disclaimer, the term of this patent is extended or adjusted under 35 U.S.C. 154(b) by 0 days.

(21) Appl. No.: 14/632,697

(22) Filed: Feb. 26, 2015

(65) Prior Publication Data

US 2016/0251082 A1    Sep. 1, 2016

(51) Int. Cl.
*B64D 11/06* (2006.01)
*F16B 41/00* (2006.01)

(52) U.S. Cl.
CPC ......... *B64D 11/0696* (2013.01); *F16B 41/002* (2013.01)

(58) Field of Classification Search
CPC .... B64D 11/0696; B64D 11/06; F16B 41/002; B60N 2/005; B60N 2/07; B60N 2/02
USPC ......... 411/386; 248/188.9, 503.1; 244/118.1, 244/118.6, 122 R
See application file for complete search history.

(56) References Cited

U.S. PATENT DOCUMENTS

| | | | | |
|---|---|---|---|---|
| 2,929,474 A | * | 3/1960 | Boardman | F16B 41/002 403/21 |
| 4,200,416 A | * | 4/1980 | Kezran | B23B 27/1659 407/108 |
| 4,771,969 A | * | 9/1988 | Dowd | B64D 11/0696 244/118.6 |
| 4,796,837 A | * | 1/1989 | Dowd | B64D 11/0696 244/122 R |
| 4,911,381 A | * | 3/1990 | Cannon | B64D 25/04 244/122 R |
| 5,083,726 A | * | 1/1992 | Schurr | B64D 11/0696 244/118.6 |
| 5,169,091 A | * | 12/1992 | Beroth | B64D 11/0696 244/118.1 |
| 5,178,346 A | * | 1/1993 | Beroth | B64D 11/0696 244/118.1 |

(Continued)

*Primary Examiner* — Jonathan Liu
*Assistant Examiner* — Muhammad Ijaz
(74) *Attorney, Agent, or Firm* — Wang Law Firm, Inc.

(57) ABSTRACT

A fixing structure for fixing a seat of a vehicle includes a fixing member which includes a locking section, a buffering section and a restricting section. The locking and restricting sections are provided with a thread for meshing with the thread of the locking passage, and the buffering section has no thread. The fixing seat includes a locking passage and a restricting space connected to the locking passage. The locking member is inserted through the cover and screwed into the fixing seat. When vibrations occur, the locking member will be unscrewed from the locking passage. However, in order to prevent the locking member from fully disengaging from the fixing seat, the buffering section is retained in the restricting space to prevent the thread of the restricting section from meshing with the thread of the locking passage, which prevents disengagement of the locking member in a vibrating condition.

8 Claims, 8 Drawing Sheets

(56) References Cited

U.S. PATENT DOCUMENTS

| | | | | |
|---|---|---|---|---|
| 5,449,132 A * | 9/1995 | Gilbert | ............... | B64D 11/0696 |
| | | | | 244/122 R |
| 5,762,296 A * | 6/1998 | Gilbert | ............... | B64D 11/0696 |
| | | | | 244/118.1 |
| 7,232,096 B1 * | 6/2007 | Ahad | ................ | B64D 11/0696 |
| | | | | 244/118.6 |
| 2007/0138821 A1 * | 6/2007 | Mejuhas | ............ | B64D 11/0696 |
| | | | | 296/65.01 |
| 2008/0191115 A1 * | 8/2008 | Stubbe | .................... | F16B 7/187 |
| | | | | 248/503.1 |
| 2009/0026827 A1 * | 1/2009 | Bishop | ................ | B60P 7/0815 |
| | | | | 297/463.1 |
| 2010/0068003 A1 * | 3/2010 | Wagner | ................... | B21H 3/02 |
| | | | | 411/386 |
| 2010/0096502 A1 * | 4/2010 | VanderWolk | ...... | B64D 11/0696 |
| | | | | 244/122 R |
| 2010/0290860 A1 * | 11/2010 | Wang | .................. | B23K 1/0008 |
| | | | | 411/105 |
| 2011/0253874 A1 * | 10/2011 | Marechal | .......... | B64D 11/0696 |
| | | | | 248/503.1 |
| 2016/0039526 A1 * | 2/2016 | Mejuhas | ............ | B60N 2/01575 |
| | | | | 248/188.9 |

* cited by examiner

FIG.8

FIXING STRUCTURE FOR FIXING A SEAT OF A VEHICLE

BACKGROUND OF THE INVENTION

Field of the Invention

The present invention relates to an aircraft seat, and more particular to a fixing structure for fixing a seat of a vehicle.

Description of the Prior Art

Figure 1:
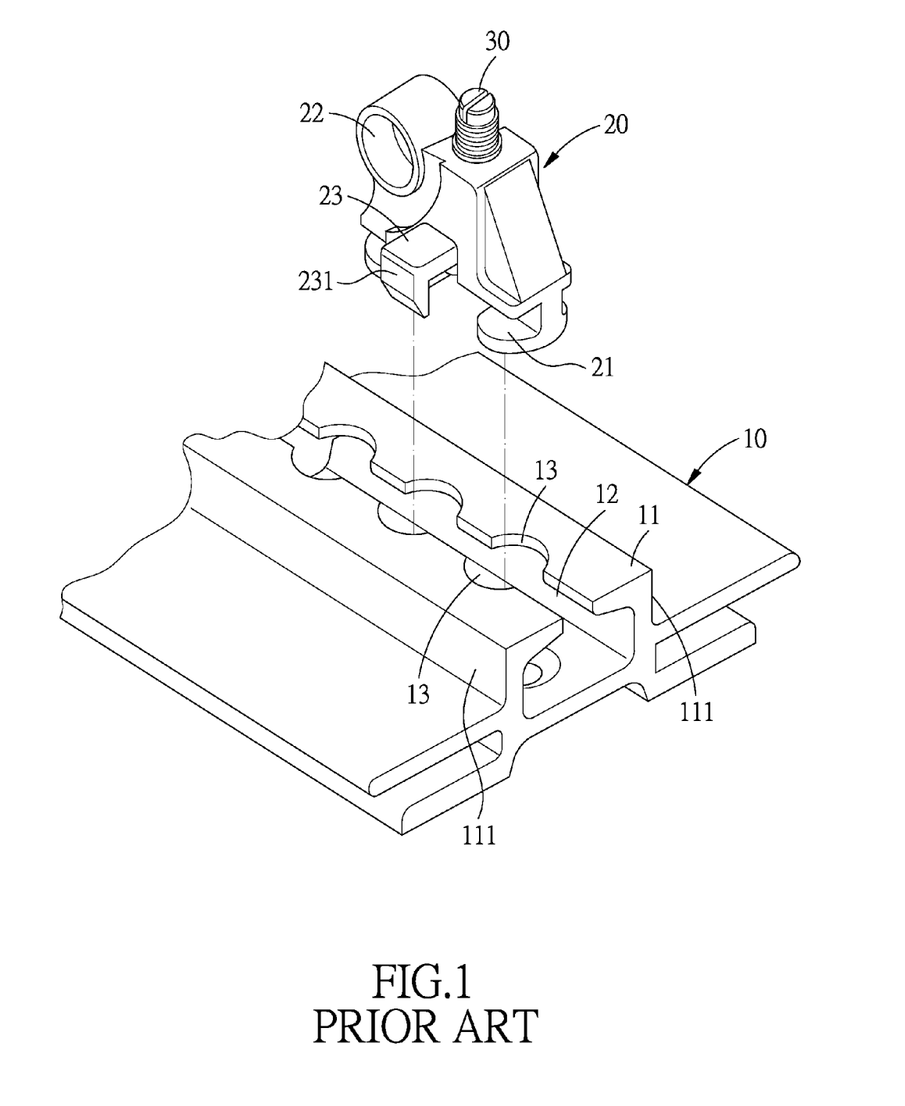
FIG. 1 is a perspective view of a conventional fixing structure for fixing an aircraft seat.
Figure 2:
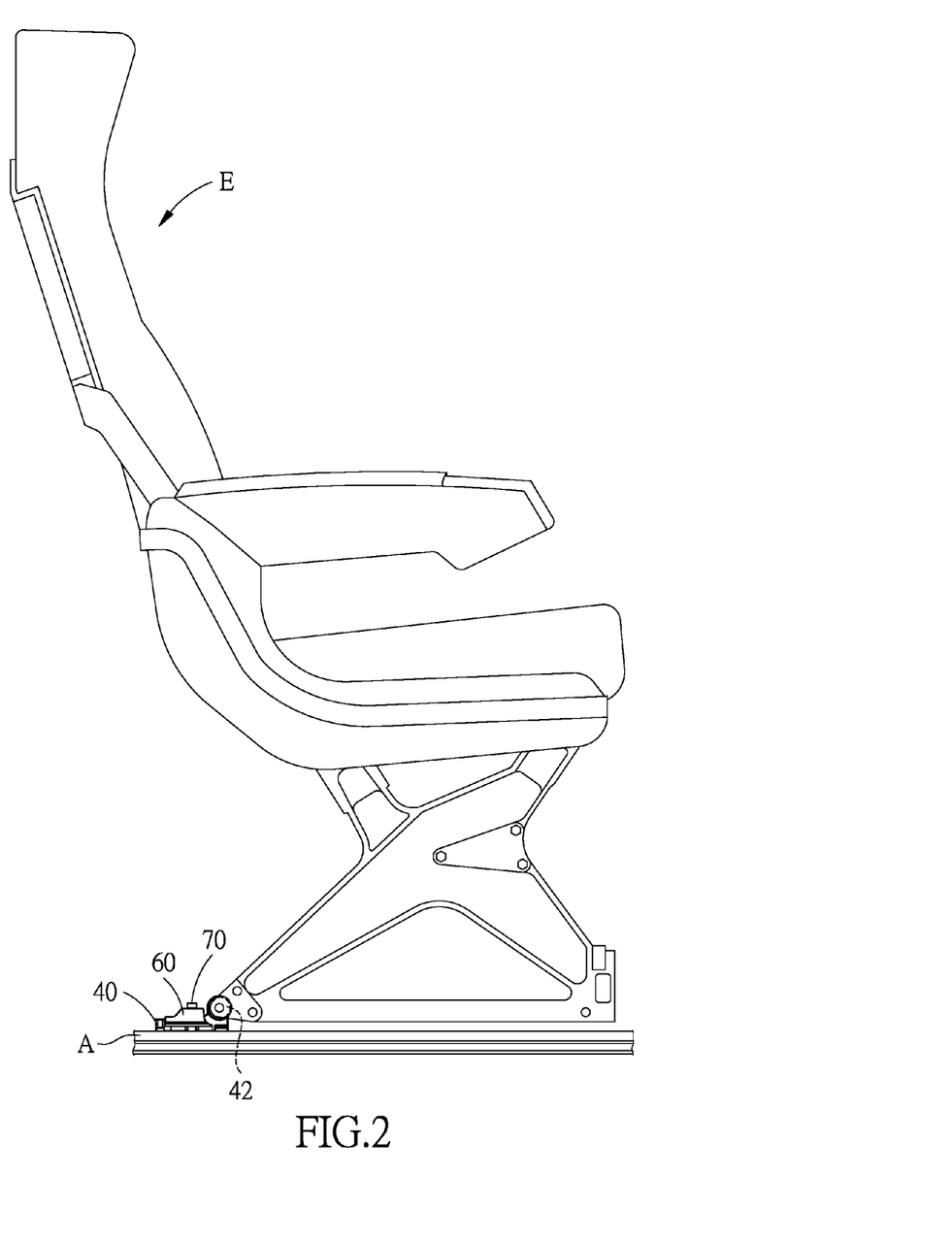
FIG. 2 is an illustrative view showing that a fixing structure for fixing a seat of a vehicle in accordance with the present invention is fixed to the seat.
Figure 3:
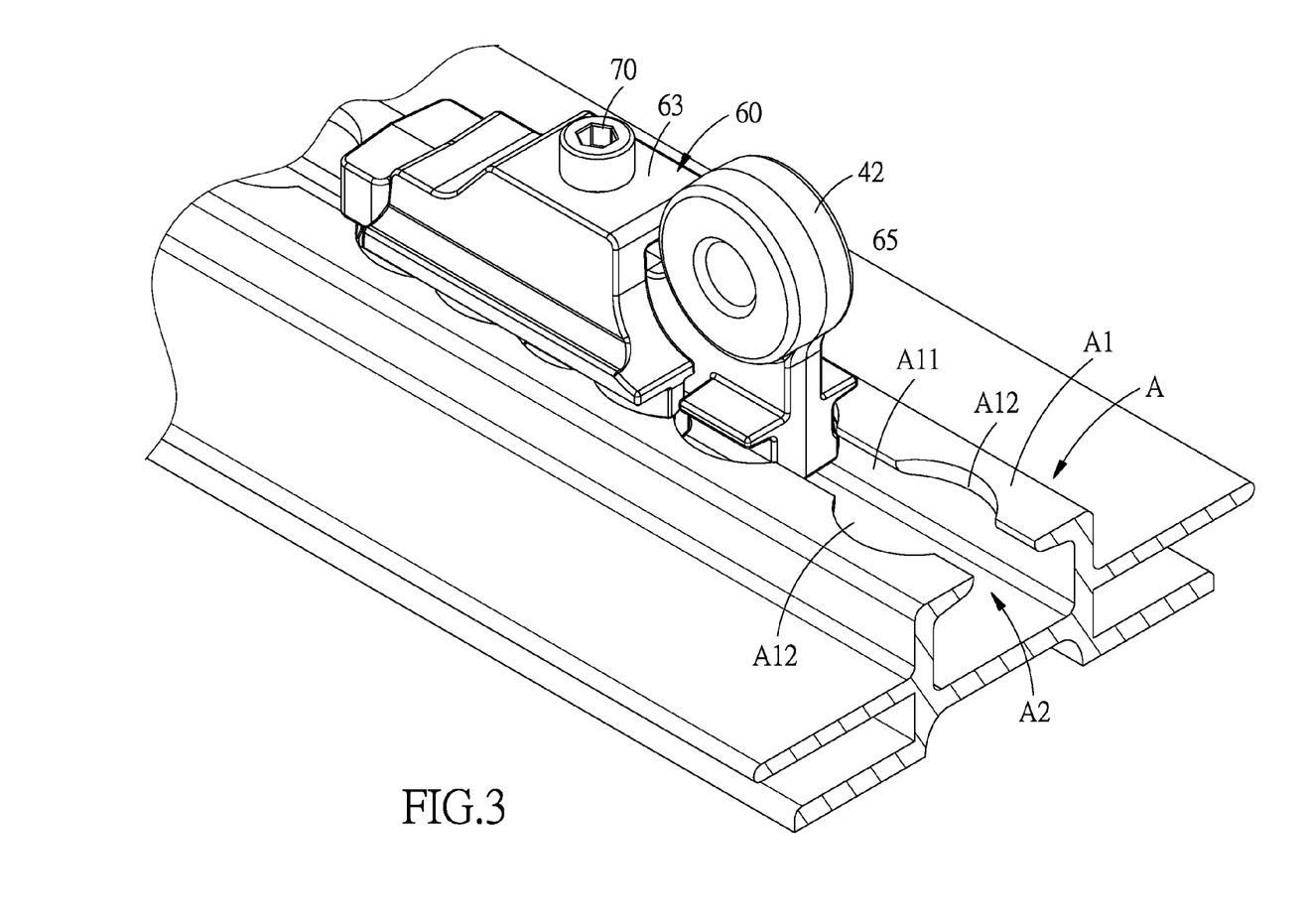
FIG. 3 is an illustrative view showing that the fixing structure for fixing a seat of a vehicle in accordance with the present invention is fixed to a slide rail.
Figure 4:
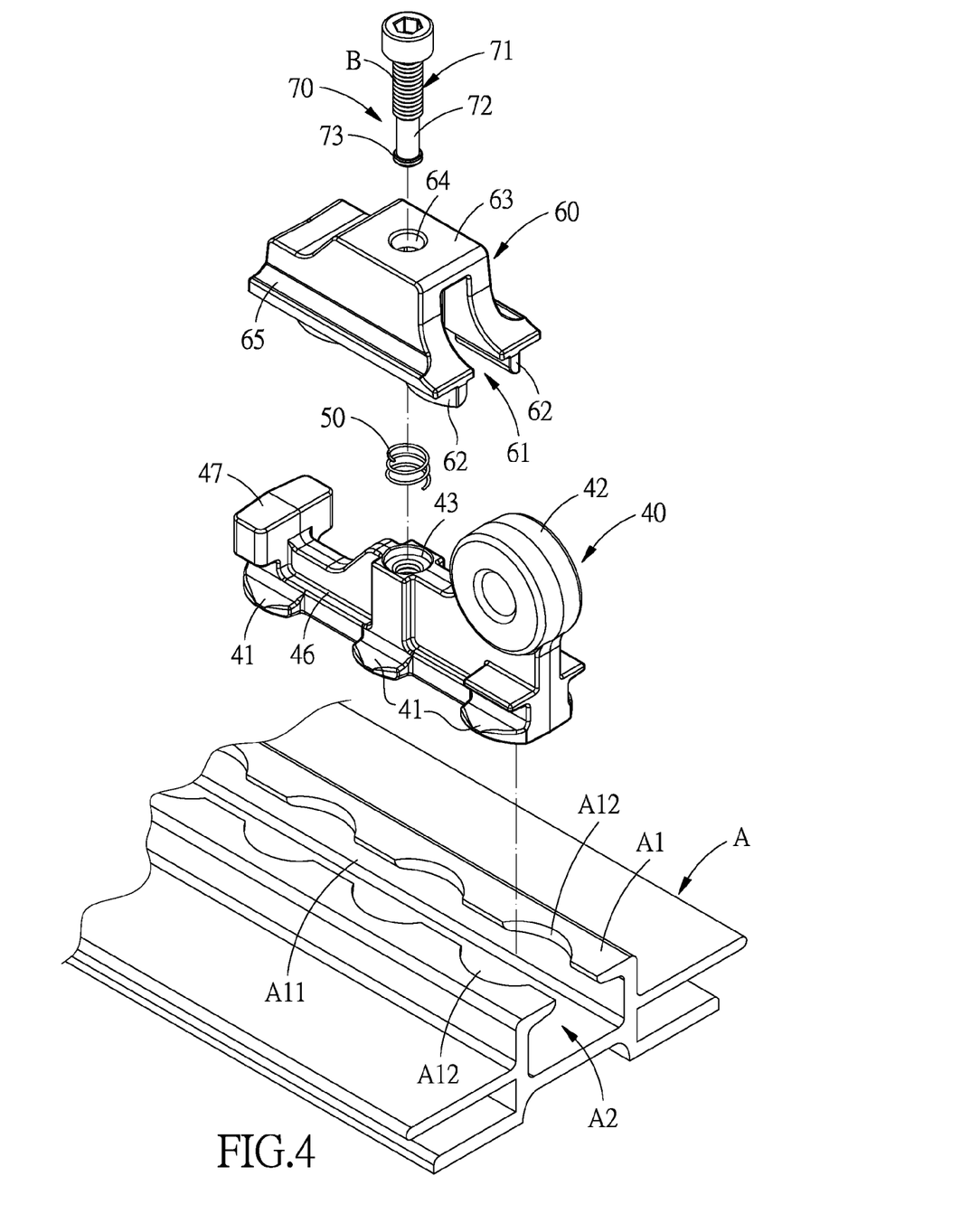
FIG. 4 is an exploded view of the fixing structure for fixing a seat of a vehicle in accordance with the present invention.
Figure 5:
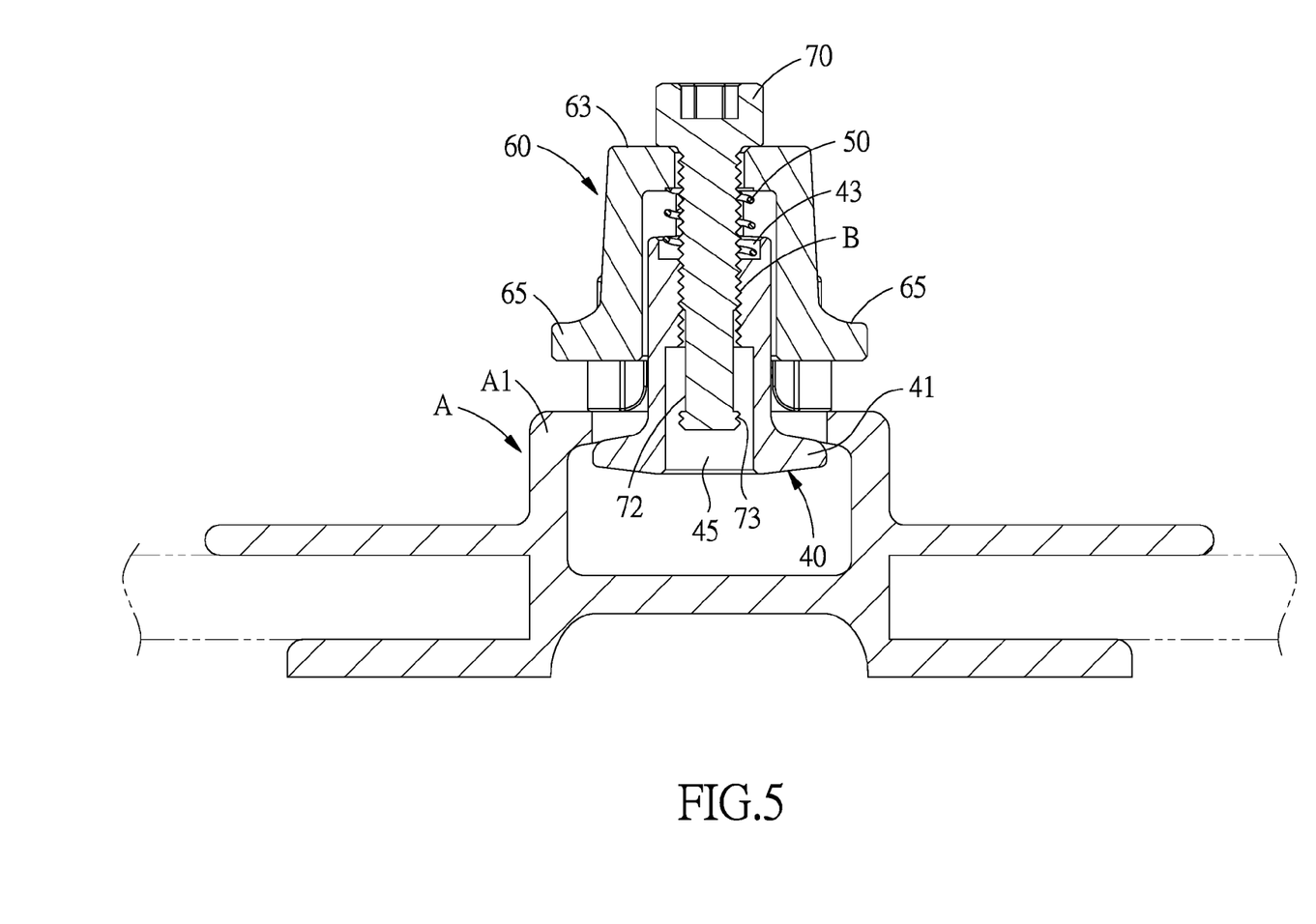
FIG. 5 is a cross sectional view of the fixing structure for fixing a seat of a vehicle in accordance with the present invention.

As shown in FIG. 1, a conventional fixing structure for an aircraft seat comprises: a slide rail 10, a fixing seat 20 and a fixing member 30. The slide rail 10 includes a top portion 11 and two lateral portions 111 which are perpendicularly connected to two sides of the top portion 11. At the top portion 11 is defined a slide slot 12 and plural spaced apart engaging apertures 13.

The fixing seat 20 includes a plurality of engaging portions 21 and a connecting portion 22. The engaging portions 21 are formed in the shape of the engaging apertures 13 and engaged into the slide rail 10 via the engaging apertures 13. The connecting portion 22 is fixed to a corresponding one of the legs of the aircraft seat, and includes a press member 23 with two paw portions 231. The press member 23 has a width corresponding to the width of the top portion 11 of the slide rail 10, and the two paw portions 231 are abutted against the two lateral portions 111.

The fixing member 30 is a screw inserted through the fixing seat 20 and has one end pressed against the press member 23.

The engaging portions 21 are formed in the shape of the engaging apertures 13 and engaged into the slide rail 10 via the engaging apertures 13, then moved to a position where the engaging portions 21 are misaligned with the engaging apertures 13, so that the fixing seat 20 is restricted in the slide rail 10 by the top portion 11.

The fixing member 30 is rotated to push the press member 23 against the top portion 11, so as to fix the fixing seat 20 to the slide rail 10.

However, the fixing member 30 is likely to loosen from the fixing seat 20 due to the vibration during bumpy flights.

The present invention has arisen to mitigate and/or obviate the afore-described disadvantages.

SUMMARY OF THE INVENTION

The primary objective of the present invention is to provide a fixing structure for fixing a seat of a vehicle, wherein the locking member of the fixing structure can be prevented from getting loose during dumpy and vibrating flights.

To achieve the above objective, a fixing structure for fixing a seat of a vehicle in accordance with the present invention comprises:

a fixing seat includes a plurality of engaging portions formed at one end, a locking passage formed at another end thereof, and a fixing portion to be fixed to a leg of the seat. One end of the locking passage is connected to a restricting space, on an inner surface of the locking passage is formed a thread, the locking passage has an inner diameter and a length.

A cover is located above one side of the fixing seat and having a flat surface formed another side and a through hole formed in the flat surface, the elastic member is disposed between the fixing seat and the cover to keep the fixing seat and the cover from each other by a buffering space therebetween.

A locking member includes a locking section, a buffering section and a restricting section, and is inserted through the through hole and screwed into the fixing seat. The locking section and the restricting section each are formed with a thread, the locking section and the restricting section have a same outer diameter equal to the inner diameter of the locking passage, and the buffering section has an outer diameter smaller than the inner diameter and having a length larger than the length of the locking passage.

It is learned from the above description that the fixing structure for fixing a seat of a vehicle in accordance with the present invention is provided with a fixing member which includes a locking section, a buffering section and a restricting section. The locking and restricting sections are provided with a thread, and the buffering section has no thread. On the fixing seat are formed a locking passage and a restricting space connected to the locking passage. On the inner surface of the locking passage is formed a thread for meshing with the thread of the locking and restricting sections. The locking member is inserted through the cover and screwed into the fixing seat via the threads. When vibrations occur, the locking member will be unscrewed from the locking passage. However, in order to prevent the locking member from fully disengaging from the fixing seat, the buffering section is retained in the restricting space to prevent the thread of the restricting section from meshing with the thread of the locking passage, which consequently prevents disengagement of the locking member even in a vibrating condition.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Referring to FIGS. 2-8, a fixing structure for fixing a seat of a vehicle in accordance with the present invention comprises: a fixing seat 40, an elastic member 50, a cover 60, and a locking member 70.

The fixing seat 40 includes a plurality of engaging portions 41 formed at one end, an elastic-member hole 43 formed at another end thereof, and a fixing portion 42 to be fixed to a leg of a seat E. The elastic-member hole 43 is connected to one end of a locking passage 44, and another end of the locking passage 44 is connected to a restricting space 45. On the inner surface 441 of the locking passage 44 is formed a thread B which is an inner thread. At the position where the locking passage 44 and the restricting space 45 are connected is defined an entrance 442. The locking passage 44 has an inner diameter X1 and a length L. At two sides of the fixing seat 40 are formed plural restricting grooves 46 which are located adjacent to the one of the fixing seat 40 where the engaging portions 41 are located, and at the another end of the fixing seat 40 is formed a protruding stop portion 47.

The elastic member 50 is a spring with one end pressed against the elastic-member hole 43.

The cover 60 is located above the fixing seat 40 and restricted by the fixing portion 42 and the stop portion 47 of the fixing seat 40, and has an opening 61 formed on a side thereof facing the fixing seat 40. The opening 61 has a width corresponding to the width of the fixing seat 40. At two sides of the opening 61 is formed a plurality of restricting portions 62 located corresponding to the restricting grooves 46. The restricting portions 62 are inserted in the restricting grooves 46 and arc-shaped to correspond to the shaped of the restricting grooves 46. The cover 60 has a flat surface 63 formed another side opposite to the opening 61, and a through hole 64 formed in the flat surface 63. The elastic member 50 is disposed in the opening 61 and pressed between the fixing seat 40 and the cover 60 to keep the fixing seat 40 and the cover 60 from each other by a buffering space C therebetween. The cover 60 further has a horizontal-extending press portion 65 formed at two sides thereof and located beside the restricting portions 62 to form a clamp structure when used in combination with the fixing seat 40.

The locking member 70 includes a locking section 71, a buffering section 72 and a restricting section 73, and is inserted through the through hole 64, the opening 61 and the elastic member 50 and screwed into the fixing seat 40. The locking section 71 and the restricting section 73 each is formed with a thread B which is an outer thread for meshing with the thread B of the inner surface 441 of the locking passage 44. The locking section 71 and the restricting section 73 have a same outer diameter X equal to the inner diameter X1 of the locking passage 44, and the buffering section 72 has an outer diameter Y smaller than the inner diameter X1 and has a length L1 larger than the length L of the locking passage 44.

Figure 6:
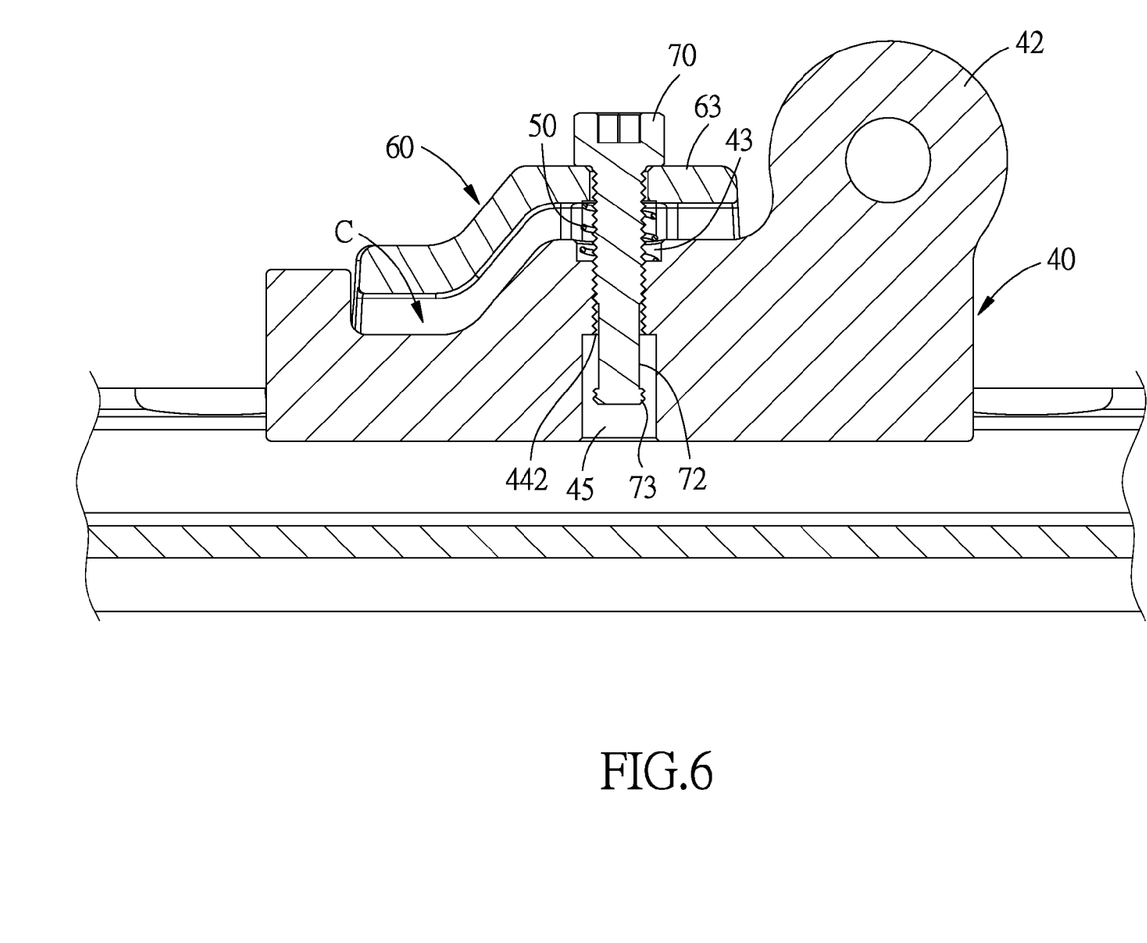
FIG. 6 is a second cross sectional view of the fixing structure for fixing a seat of a vehicle in accordance with the present invention.

Referring to FIG. 6, which shows the locking status of the present invention, the fixing structure for fixing a seat of a vehicle in accordance with the present invention is locked to a hollow slide rail A which includes a top portion A1 and a hollow mounting portion A2. A slide groove A11 is defined on the top portion A1, along the slide groove A11 is arranged a plurality of engaging apertures A12 formed in the shapes of the engaging portions 41 and the restricting portions 62. The engaging portions 41 are inserted into the mounting portion A2 via the engaging apertures A12, then the fixing seat 40 is moved to a position where the engaging portions 41 are misaligned with the engaging apertures A12, so that the fixing seat 40 is restricted in the slide rail A by the top portion A1.

The locking member 70 is then rotated to press the cover 60 and the fixing seat 40 against the top portion A1 of the slide rail A, the cover 60 and the fixing seat 40 are pulled toward each other by the locking member 70, while the engaging portions 41 of the fixing seat 40 are stopped by the top portion A1. Hence, the engaging portions 41 will be pressed tightly against the top portion A1, and the press portion 65 of the cover 60 also presses against the top portion A1, so as to provide a clamping force toward the top portion A1, plus the engagement between the restricting portions 62 and the engaging apertures A12, which stops the fixing seat 40 from moving in the slide rail A, and consequently preventing the engaging portions 41 of the fixing seat 40 from disengaging from the engaging apertures A12 of the slide rail A.

When the locking member 70 is in the locked state, the restricting section 73 is inserted through the locking passage 44 and into the restricting space 45, the buffering section 72 is partially located in the locking passage 44 and partially or totally in the restricting space 45, and the locking section 71 is partially located in the locking passage 44 and has the thread B meshed with the thread B of the inner surface 441 of the locking passage 44.

Figure 7:
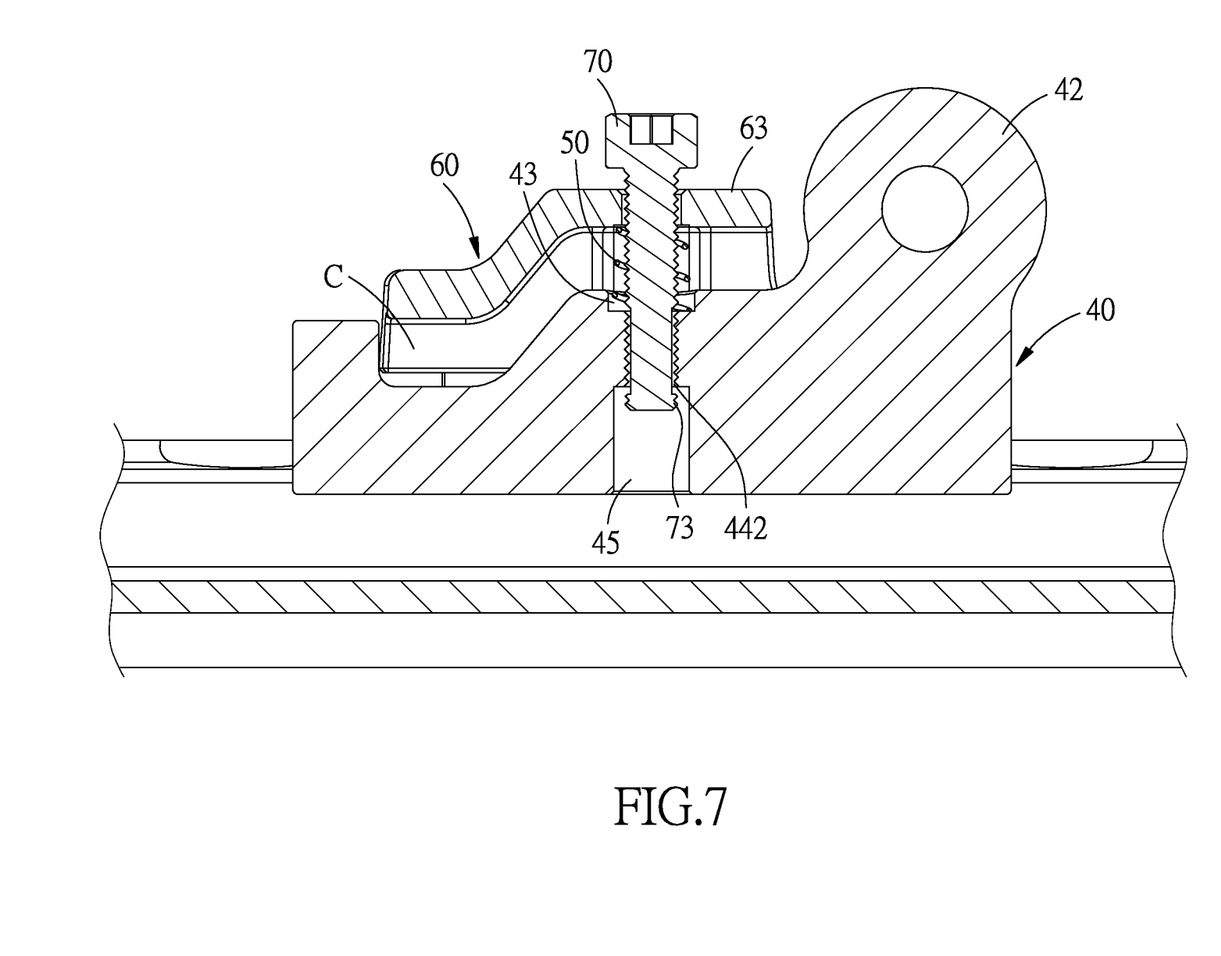
FIG. 7 is a third cross sectional view of the fixing structure for fixing a seat of a vehicle in accordance with the present invention.
Figure 8:
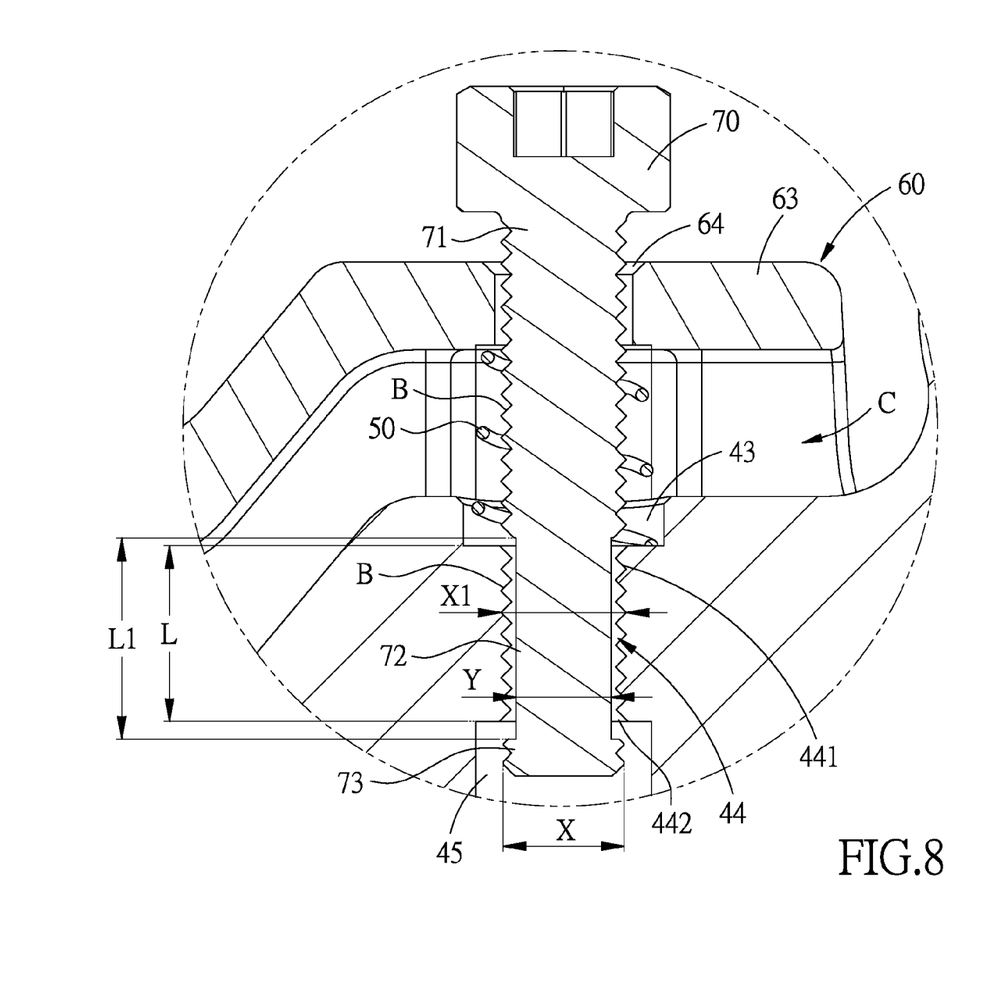
FIG. 8 is an enlarged view of a part of the fixing structure for fixing a seat of a vehicle in accordance with the present invention.

Referring then to FIG. 7, during a bumpy journey, if the thread B of the locking section 71 of is unscrewed from the thread B of the inner surface 441 of the locking passage due to the vibrations during the bumpy transport, causing disengagement of the locking member 70 from the locking passage 44, at this moment, the locking member 70 will move toward the cover 60 until the buffering section 72 moves into the locking passage 44. Since the buffering section 72 is provided with no thread B for meshing with the thread B of the locking passage 44, and has an outer diameter Y smaller than the inner diameter X1 of the locking passage 44, plus the gravity of the locking member 70, all these factors would stop the buffering section 72 from moving up and prevent the restricting section 73 from meshing with the thread B of the inner surface 441 of the locking passage 44.

Besides, the buffering section 72 has a length L1 larger than the length L of the locking passage 44, when in an unlocked state and under the effect of gravity, the buffering section 72 is partially inserted into the restricting space 45, and the restricting section 73 is located a distance away from the entrance 442, which prevents the thread B of the restricting section 73 from coming into contact and meshing with the thread B of the inner surface 441 of the locking passage 44. Namely, the locking member 70 won't be disengaged from the locking passage 44 because of vibrations even in a unlocked status.

It is learned from the above description that the fixing structure for fixing a seat of a vehicle in accordance with the present invention is provided with a fixing member which includes a locking section, a buffering section and a restricting section. The locking and restricting sections are provided with a thread, and the buffering section has no thread. On the fixing seat are formed a locking passage and a restricting space connected to the locking passage. On the inner surface of the locking passage is formed a thread for meshing with the thread of the locking and restricting sections. The locking member is inserted through the cover and screwed into the fixing seat via the threads. When vibrations occur, the locking member will be unscrewed from the locking passage. However, in order to prevent the locking member from fully disengaging from the fixing seat, the buffering section is retained in the restricting space to prevent the thread of the restricting section from meshing with the thread of the locking passage, which consequently prevents disengagement of the locking member even in a vibrating condition.

While we have shown and described various embodiments in accordance with the present invention, it is clear to those skilled in the art that further embodiments may be made without departing from the scope of the present invention.

What is claimed is:

1. A fixing structure for fixing a seat of a vehicle comprising:
a fixing seat including a plurality of engaging portions formed at one end, a locking passage, and a fixing portion to be fixed to a leg of the seat, one end of the locking passage being connected to a restricting space, on an inner surface of the locking passage being formed a thread, the locking passage having an inner diameter and a length;
a cover being located above one side of the fixing seat and having a flat surface formed at another side of the fixing seat and a through hole formed in the flat surface; and
a locking member including a locking section, a buffering section and a restricting section, and being inserted through the through hole and screwed into the fixing seat, the locking section and the restricting section each being formed with a thread, the locking section and the restricting section having a same outer diameter equal to the inner diameter of the locking passage, and the buffering section having an outer diameter smaller than the inner diameter and having a length longer than the length of the locking passage;
wherein an elastic member is disposed between the fixing seat and the cover, and an elastic-member hole for holding the elastic member is formed at another end of the fixing seat and in communication with the locking passage, and the elastic member is a spring.

2. The fixing structure for fixing the seat of the vehicle as claimed in claim 1, wherein the cover has an opening formed on a side thereof facing the fixing seat, the cover is further provided with a horizontal-extending press portion to form a clamp structure when used in combination with the fixing seat.

3. The fixing structure for fixing the seat of the vehicle as claimed in claim 1, wherein the fixing seat is provided with plural restricting grooves, at two sides of the opening is formed a plurality of restricting portions located corresponding to the restricting grooves, and the restricting portions are arc-shaped to correspond to the shape of the restricting grooves.

4. The fixing structure for fixing the seat of the vehicle as claimed in claim 1, wherein the threads of the locking section and the restricting section are meshed with the thread of the inner surface of the locking passage.

5. A fixing structure for fixing a seat of a vehicle comprising:
a fixing seat including a fixing portion to be fixed to a leg of the seat, and a locking passage formed, the locking passage being provided with a thread, and having an inner diameter and a length;
a cover being located at one side of the fixing seat; and
a locking member including a locking section, a buffering section and a restricting section, and being inserted through the cover and screwed into the fixing seat, the locking section and the restricting section each being formed with a thread, the locking section and the restricting section having a same outer diameter equal to the inner diameter of the locking passage, and the buffering section having an outer diameter smaller than the inner diameter and having a length mer longer than the length of the locking passage;
wherein an elastic member is disposed between the fixing seat and the cover, the fixing seat has a plurality of engaging portions formed at one end thereof, the locking passage is connected to a restricting space, an elastic-member hole for holding the elastic member is formed at another end of the fixing seat and in communication with one end of the locking passage, the thread of the locking passage is formed on an inner surface of the locking passage, and the elastic member is a spring.

6. The fixing structure for fixing the seat of the vehicle as claimed in claim 5, wherein the cover has an opening formed on a side thereof facing the fixing seat, the cover is further provided with a horizontal-extending press portion to form a clamp structure when used in combination with the fixing seat.

7. The fixing structure for fixing the seat of the vehicle as claimed in claim 5, wherein the fixing seat is provided with plural restricting grooves, at two sides of the opening is formed a plurality of restricting portions located corresponding to the restricting grooves, and the restricting portions are arc-shaped to correspond to the shape of the restricting grooves.

8. The fixing structure for fixing the seat of the vehicle as claimed in claim 5, wherein the threads of the locking section and the restricting section are meshed with the thread of the inner surface of the locking passage.

* * * * *